United States Patent
Kim et al.

(10) Patent No.: US 9,100,915 B2
(45) Date of Patent: Aug. 4, 2015

(54) CONNECTION CONTROL APPARATUS AND METHOD FOR MOBILE COMMUNICATION SYSTEM

(75) Inventors: Seong Min Kim, Seoul (KR); Ki Back Kim, Seoul (KR); Yoon Jeong Ha, Seongnam-si (KR); Bong Ju Kim, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 13/523,401

(22) Filed: Jun. 14, 2012

(65) Prior Publication Data

US 2012/0322482 A1 Dec. 20, 2012

(30) Foreign Application Priority Data

Jun. 15, 2011 (KR) ........................ 10-2011-0057788

(51) Int. Cl.
*H04B 7/00* (2006.01)
*H04W 52/02* (2009.01)
*H04W 76/04* (2009.01)

(52) U.S. Cl.
CPC ...... *H04W 52/0219* (2013.01); *H04W 52/0216* (2013.01); *H04W 76/046* (2013.01)

(58) Field of Classification Search
USPC .................................................. 455/509, 574
See application file for complete search history.

(56) References Cited

U.S. PATENT DOCUMENTS

| | | | |
|---|---|---|---|
| 2010/0062771 A1* | 3/2010 | Sundberg et al. | 455/436 |
| 2010/0150086 A1* | 6/2010 | Harada et al. | 370/329 |
| 2011/0087913 A1* | 4/2011 | Robles et al. | 713/330 |
| 2014/0194128 A1* | 7/2014 | Akiyama | 455/445 |

* cited by examiner

*Primary Examiner* — Fayyaz Alam
(74) *Attorney, Agent, or Firm* — Jefferson IP Law, LLP

(57) ABSTRACT

An apparatus and method for a base station to control a state of a mobile station based on a traffic condition of the mobile station are provided. The terminal operation control method includes controlling a terminal having ongoing traffic while the terminal is in an awake state, determining whether a pseudo awake timer of the terminal expires, wherein the pseudo awake timer counts a time for which the terminal in the awake state has no traffic, withdrawing, when the pseudo awake timer expires, a resource allocated to the terminal, and transitioning the state of the terminal to a pseudo awake state.

20 Claims, 5 Drawing Sheets

CONNECTION CONTROL APPARATUS AND METHOD FOR MOBILE COMMUNICATION SYSTEM

PRIORITY

This application claims the benefit under 35 U.S.C. §119(a) of a Korean patent application filed on Jun. 15, 2011 in the Korean Intellectual Property Office and assigned Serial No. 10-2011-0057788, the entire disclosure of which is hereby incorporated by reference.

BACKGROUND OF THE INVENTION

1. Field of the Invention

The present invention relates to a connection control method and apparatus for a mobile communication system. More particularly, the present invention relates to an apparatus and method for a base station to control a state of a mobile station based on a traffic condition of the mobile station.

2. Description of the Related Art

WiMAX is a mobile network technology which supports a limited Channel Quality Indicator Channel (CQICH) and thus the number of mobile stations in an awake state is limited. CQICH is a channel allocated per mobile station in order for the mobile station to report the channel condition to the base station. In a WiMAX system, the mobile station for which no traffic is scheduled in a predetermined duration transitions to an idle state to withdraw the CQICH resource allocated to the mobile station, and allocates the withdrawn resource to a new mobile station, thereby improving resource utilization efficiency.

In a case where a subscriber attempts access to the service which is connected by a maximum number of users or subscribers, the system cannot accommodate any more mobile stations, resulting in an access attempt failure of the new mobile station. Typically, the transition to the idle state or the sleep state is determined through interaction with the mobile station using an idle or sleep timer which is set to, for example, a few dozen seconds to avoid frequent transitions between the idle and active states. This impedes the mobile stations connected to the network when they would ideally transition to the idle or sleep state and, as a consequence, new subscribers cannot connect to the network.

SUMMARY OF THE INVENTION

Aspects of the present invention are to address at least the above-mentioned problems and/or disadvantages and to provide at least the advantages described below. Accordingly, an aspect of the present invention is to provide a connection control apparatus and method that is capable of allowing a subscriber to access the service for which a maximum number of Channel Quality Indicator Channels (CQICHs) have been allocated to other subscribers, using a Pseudo Awake State defined for efficient use of the limited resource of a mobile communication system. The Pseudo Awake State is controlled by the system without interaction with the mobile station. The system checks the state of the mobile station staying in the Pseudo Awake State periodically and, when the mobile station is in an abnormal state, withdraws the resource allocated to the corresponding mobile station.

In accordance with an aspect of the present invention, a terminal operation control method of a base station is provided. The method includes controlling a terminal having ongoing traffic during an awake state, determining whether a pseudo awake timer of the terminal expires, wherein the pseudo awake timer counts a time for which the terminal in the awake state has no traffic, withdrawing, when the pseudo awake timer expires, a resource allocated to the terminal, and transitioning the state of the terminal to a pseudo awake state.

In accordance with another aspect of the present invention, an apparatus of a base station for controlling terminal operation in a mobile communication system is provided. The apparatus includes a time manager which includes a pseudo awake transition timer for counting a time for which the terminal in an awake state has no traffic to perform a state transition of the terminal to a pseudo awake state, an awake user number buffer for storing a number of awake state terminals connected to the system, a resource manager which includes a pseudo awake user number buffer for storing a number of pseudo awake terminals managed by the system, and a state manager for managing the terminal having ongoing traffic as the terminal in the awake state, for monitoring to detect an expiration of a pseudo awake timer of each terminal in the awake state, for withdrawing a resource allocated to the terminal of which the pseudo awake timer expires, and for transitioning the state of the terminal to the pseudo awake state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
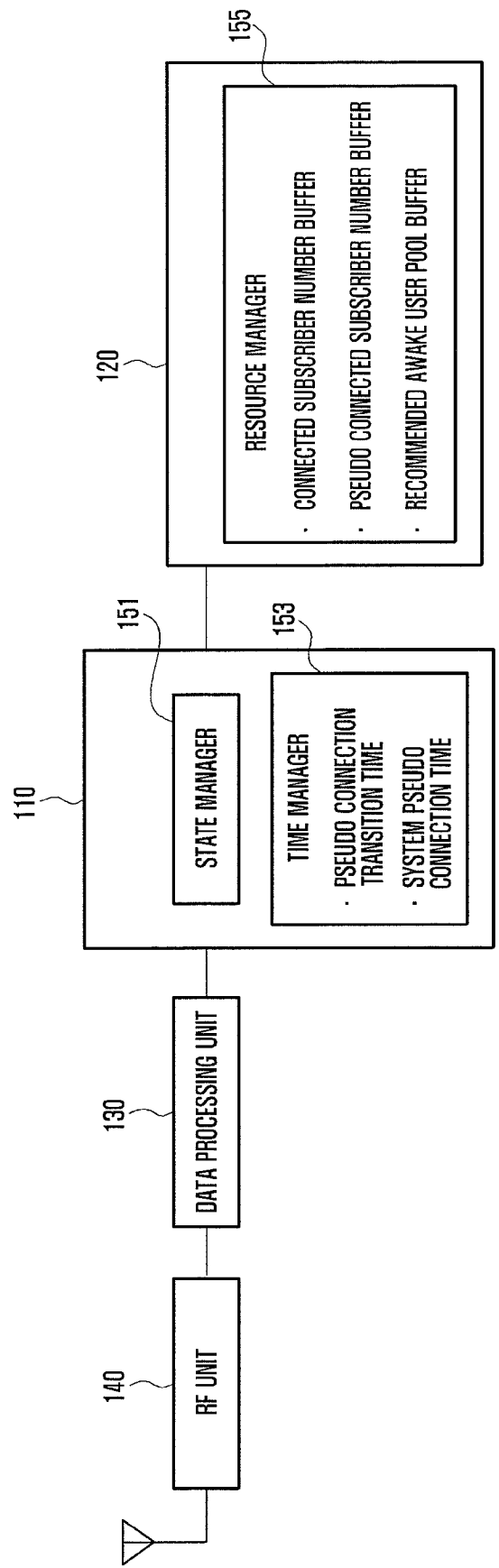
FIG. 1 is a block diagram illustrating a configuration of a base station in a mobile communication system according to an exemplary embodiment of the present invention.

FIG. 1 is a block diagram illustrating a configuration of a base station in a mobile communication system according to an exemplary embodiment of the present invention.

Referring to FIG. 1, the Radio Frequency (RF) unit 140 is responsible for radio communication with mobile stations. The RF unit 140 can include an RF transmitter and an RF receiver. The RF transmitter converts a baseband signal to be transmitted into a radio frequency signal, amplifying the RF signal, and transmits the radio frequency signal to the mobile station. The RF receiver converts the RF signal received from a mobile station into the baseband signal. The data processing unit 130 can comprise a modem and can include a transmission data processor and a reception data processor. The transmission data processor converts downlink channel data to physical channel data and transmits the physical channel data by means of the RF transmitter of the RF unit 140. The reception data processor is responsible for demodulating the signal received by the RF receiver of the RF unit 140. The data processing unit 130 can be, for example, an Orthogonal Frequency Division Multiplexing (OFDM) modem.

The control unit 110 controls overall operations of the base station and especially the state transition of the mobile station based on the mobile station's operation state. According to an exemplary embodiment of the present invention, the control unit 110 can include a state manager 151 and a time manager 153.

The memory 120 stores application programs and data related to the operations of the base station and includes a resource manager 155 for controlling the state of the mobile station according to an exemplary embodiment of the present invention.

Descriptions are made of the operations of the function blocks of the base station depicted in FIG. 1 according to an exemplary embodiment of the present invention.

The state manager 151 controls the state transition of the mobile terminal according to an exemplary embodiment of the present invention. The states include a null state, an awake state, a pseudo awake state, a sleep state, and an idle state. The null state is the state where the mobile station has powered off. The awake state is the state where the mobile station is exchanging data with the base station. The pseudo awake state is the state where the mobile station is in the awake state without a radio resource allocated by the base station.

The resource manager 155 is a database for managing numbers of mobile stations operating in the respective states under the control of the state manager 151 and can include a connected subscriber number (hereinafter, referred to as awake user number) buffer, a pseudo awake user number buffer, and a recommended awake user pool buffer. Here, the awake user number buffer is the database (DB) for managing the number of awake users connected to the system such that it is possible to increase the number of mobile stations to be served by adjusting the value of the DB according to an exemplary embodiment of the present invention. The pseudo awake user number buffer is the DB defining a number of pseudo awake users managed in the system. The recommended awake user pool DB is the DB storing a number of mobile stations that cannot transition to the awake state due to the lack of the resource. That is, in a case where there is no available awake user resource when a mobile station transitions from the pseudo awake state to the awake state, the state manager 151 registers the awake user with the recommended awake user pool and, when the resource becomes available afterward, transitions the operation state of the mobile station to the awake state in the order of registration. The time manager 153 includes timers used for determining the state transition of the mobile station, i.e., a pseudo awake transition timer and a system pseudo awake timer. The pseudo awake transition time is a time value managed for transitioning to the pseudo awake state. The system pseudo awake time is a time value managed for erasing the station information when the mobile station in the pseudo awake state is disconnected abnormally.

The pseudo awake state is the operation state in which the mobile station maintains the awake state but operates as if it is in the sleep state without traffic such that the Channel Quality Indicator Channels (CQICHs) and related radio resource are withdrawn by the system. That is, although the mobile station maintains the state defined in the technical standard, the resource allocation is controlled based on the state added in view of the system. If there is no traffic for the mobile station in the awake state for a predetermined time duration, the state manager 151 withdraws the radio resource allocated to the mobile station regardless of the operation state of the mobile terminal and transitions the state of the mobile station managed by the system (i.e., the resource allocated to the mobile station in the awake state without traffic for a predetermined duration) to the pseudo awake state. In an exemplary embodiment of the present invention, it is possible to acquire the effect of increasing the maximum number of users by allowing the active users transmitting/receiving packet data to share the radio resource, although the actual maximum number of users connected to the system simultaneously is not increased. This method is capable of minimizing the state transition delay because no separate signaling between the mobile and base stations is necessary. That is, the pseudo awake state is controlled by the system without interaction with the mobile station.

Figure 2:
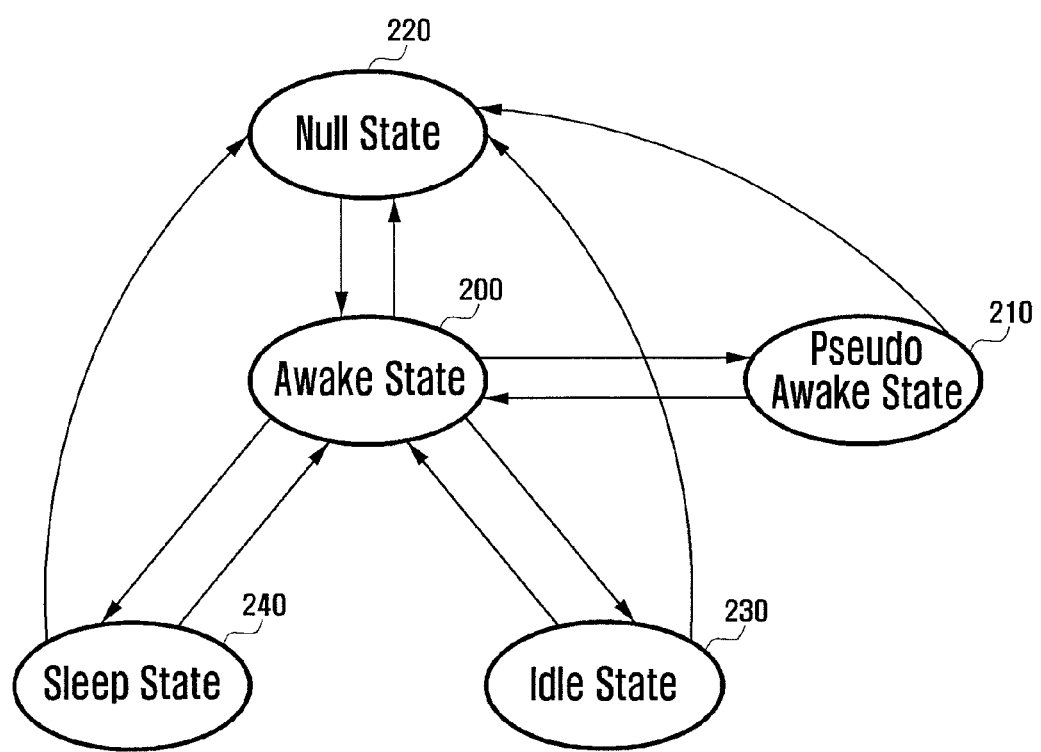
FIG. 2 is a diagram illustrating state transitions of a mobile station in a mobile communication system according to an exemplary embodiment of the present invention.

FIG. 2 is a diagram illustrating state transitions of a mobile station in a mobile communication system according to an exemplary embodiment of the present invention.

In an exemplary embodiment of the present invention, it is assumed that a time interval between transmission traffic packets is longer than the pseudo awake state transition time and shorter than the idle state transition time.

Referring to FIG. 2, the null state 220 is the state where the mobile station has powered off. If it powers on, the mobile station establishes a radio link connection and transitions from the null state 220 to the awake state 200. The awake state 200 is the state where the mobile station exchanges data with the base station. In a WiMAX system, the mobile station reports the received signal strength to the base station through a CQICH such that the base station selects an appropriate channel coding scheme based on the report. In the WiMAX system, the number of CQICHs that a base station can allocate to the mobile stations in the awake state is such that the base station restricts the number of awake state mobile stations accommodated in the system.

In the case where the mobile station in the awake state has no traffic to transmit or receive for a predetermined duration, the base station withdraws the radio resource with the transition of the corresponding resource state to the pseudo awake state 210 without a state transition of the mobile station. That is, the mobile station is still in an awake state but no longer has the radio resource allocated to it.

If an idle event or a sleep event takes place while the mobile station is in the pseudo awake state 210, the base station transitions the state of the mobile station to the awake state 200 and then to the corresponding sleep state 240 or idle state 230. Afterward, if traffic is detected, the mobile station transitions to the awake state 200 to transmit or receive the traffic. The idle state 230 and the sleep state 240 can be managed according to the configurations of the mobile station and the system.

The state transitions depicted FIG. 2 according to an exemplary embodiment of the present invention can be summarized as follows: the base station can transition the state of the mobile station from the awake state 200 to the pseudo awake state 210, from the pseudo awake state 210 to the null state 220, or from the pseudo awake state 210 to the awake state 200.

First, a description is made of the state transition of the mobile station from the awake state 200 to the pseudo awake state 210 by the base station of a WiMAX network according to an exemplary embodiment of the present invention.

The base station checks the information on whether the pseudo awake transition timer of the mobile station in the awake state 200 without traffic has expired, the number of the mobile stations in the active state, and the sum of the numbers of the mobile stations in the awake state 200 and the pseudo awake state 210 so as to transition the state of the corresponding terminal to the pseudo awake state 210 based on the information.

Here, the pseudo awake timer can be a timer expiring when the mobile station has no traffic for a predetermined duration. Even though the pseudo awake time expiration event occurs, the base station may allow the mobile station to remain in the awake state 200 so long as the number of the mobile stations in the awake state 200 does not exceed a predetermined value.

The base station also manages the number of the mobile stations in the awake state 200 and the number of the mobile stations in the pseudo awake state 210 and checks whether the sum of the numbers of the mobile stations in the awake state 200 and the pseudo awake state 210 is greater than a predetermined value so as to transition the state of the mobile station to the pseudo awake state 210 in an available range. When transitioning the state of the mobile station to the awake state 200, the base station can send the mobile station a CQICH allocation Information Element (IE) (duration=0) as defined in the WiMAX 802.16e standard so as to manage the mobile station in the pseudo awake state 210 after the mobile station releases the CQICH resource.

Second, a description is made of the state transition of the mobile station from the pseudo awake state 210 to the null state 220 by the base station of the WiMAX network.

The base station checks the time when the message transmitted by the mobile station in the pseudo awake state 210 is received and, if the message is not received in the system pseudo awake timer, then transitions the state of the mobile station to the null state 220. Here, the base station saves and manages the time when the Bandwidth Request Traffic Header (BRTH) message (BR=0) is transmitted by the mobile station managed in the pseudo awake state 210. The system pseudo awake timer expires when no bandwidth request (BR=0) is received from the corresponding mobile station in a predetermined time duration. If the time expires, the base station initializes the system resource related to the corresponding mobile station and transitions the state of the mobile station to the null state 220.

Third, a description is made of the state transition of the mobile station from the pseudo awake state 210 to the awake state 200 by the base station of the WiMAX network.

If the mobile station in the pseudo awake state 210 requests service, the base station checks the resource so as to transition, if there is available resource, the state of the mobile station to the awake state 200 and, otherwise, registers the service request with the recommend awake user pool.

If there is UpLink (UL) data to be transmitted, the mobile station transmits BRTH(BR) to the base station. If the BRTH (BR) is received from the mobile station in the pseudo awake state 210 or if there is the traffic transmitted from the core network to the mobile station in the pseudo awake state 210, the base station determines to transition the mobile station to the awake state 200. If the mobile station in the pseudo awake state 210 attempts to transition to the awake state 200, the base station checks the number of terminals in the awake state 200 to determine whether the state transition is available and, if available, allocates an available radio resource to the corresponding mobile station with the state transition to the awake state 200 to restart the service. Otherwise, if the state transition is unavailable, the base station registers the mobile station attempting transition to the awake state 200 with the recommended awake user pool.

Fourth, if an event triggering a state transition of the mobile station from the awake state 200 to another state (idle/pseudo awake/null state) occurs, the base station of the WiMAX network checks the mobile station information registered in the recommended awake user pool and transitions the state of the mobile station to the awake state 200.

Fifth, if an event triggering a state transition of the mobile station from the pseudo awake state 210 to the idle state 230 occurs, the base station of the WiMAX network transitions the state of the mobile station to the awake state 200 and then to the idle state 230. When transitioning from the pseudo awake state 210 to the awake state 200, the base station preoccupies a predetermined amount of resource during the awake mobile station resource management in order to avoid signaling a failure due to exhaustion of the resource. After transitioning from the pseudo awake state 210 to the awake state 200, the station performs signaling for transition to the idle state 230.

A description is made of the base station operation for controlling the state transition of a mobile station according to the mobile station's traffic according to an exemplary embodiment of the present invention.

Figure 3:
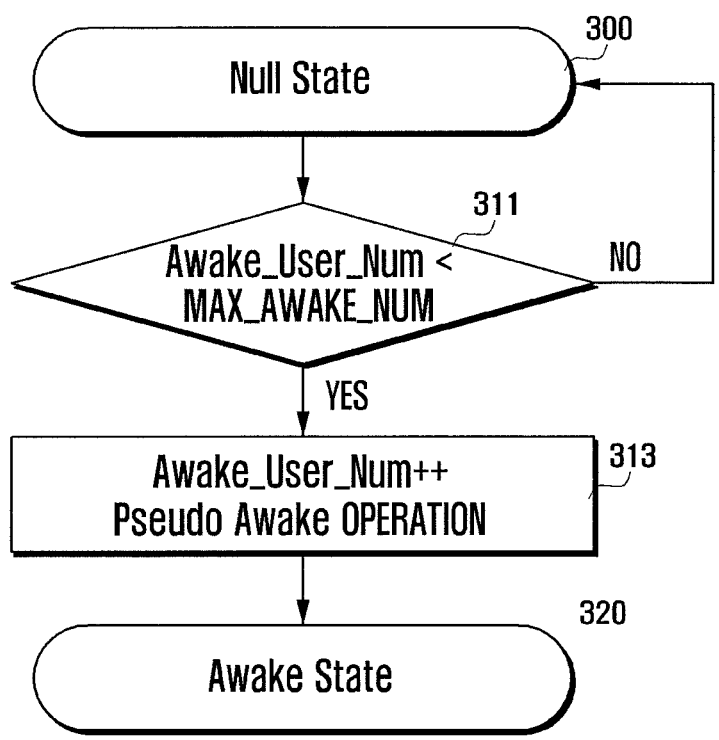
FIG. 3 is a flowchart illustrating a base station procedure for a state transition of a mobile station from a null state to an awake state in the connection control method according to an exemplary embodiment of the present invention.

FIG. 3 is a flowchart illustrating a base station procedure for a state transition of a mobile station from the null state to the awake state in the connection control method according to an exemplary embodiment of the present invention.

Referring to FIG. 3, the base station detects the initial access of the mobile station in the null state at step 300 and determines whether a number of awake mobile stations is less than the predetermined maximum number of awake mobile stations (Awake_User_Num<MAX_AWAKE_NUM) at step 311. If the number of the awake mobile stations is determined to be less than the maximum number of awake mobile stations, the base station increases the number of awake mobile stations (Awake_User_NUM++) by one in the awake user number DB and performs a pseudo awake operation at step 313 and transitions the state of the mobile station to awake state at step 320. Otherwise, if the number of the awake stations is determined to be equal to or greater than the maximum number of awake mobile stations at step 311, the base station returns the procedure to step 300 such that the mobile station stays in the null state.

As aforementioned, in the initial access process of the mobile station, the base station determines whether the number of awake mobile stations is less than the maximum number of awake mobile stations and performs, only when there is available resource to allocate, steps 313 and 320.

Figure 4:
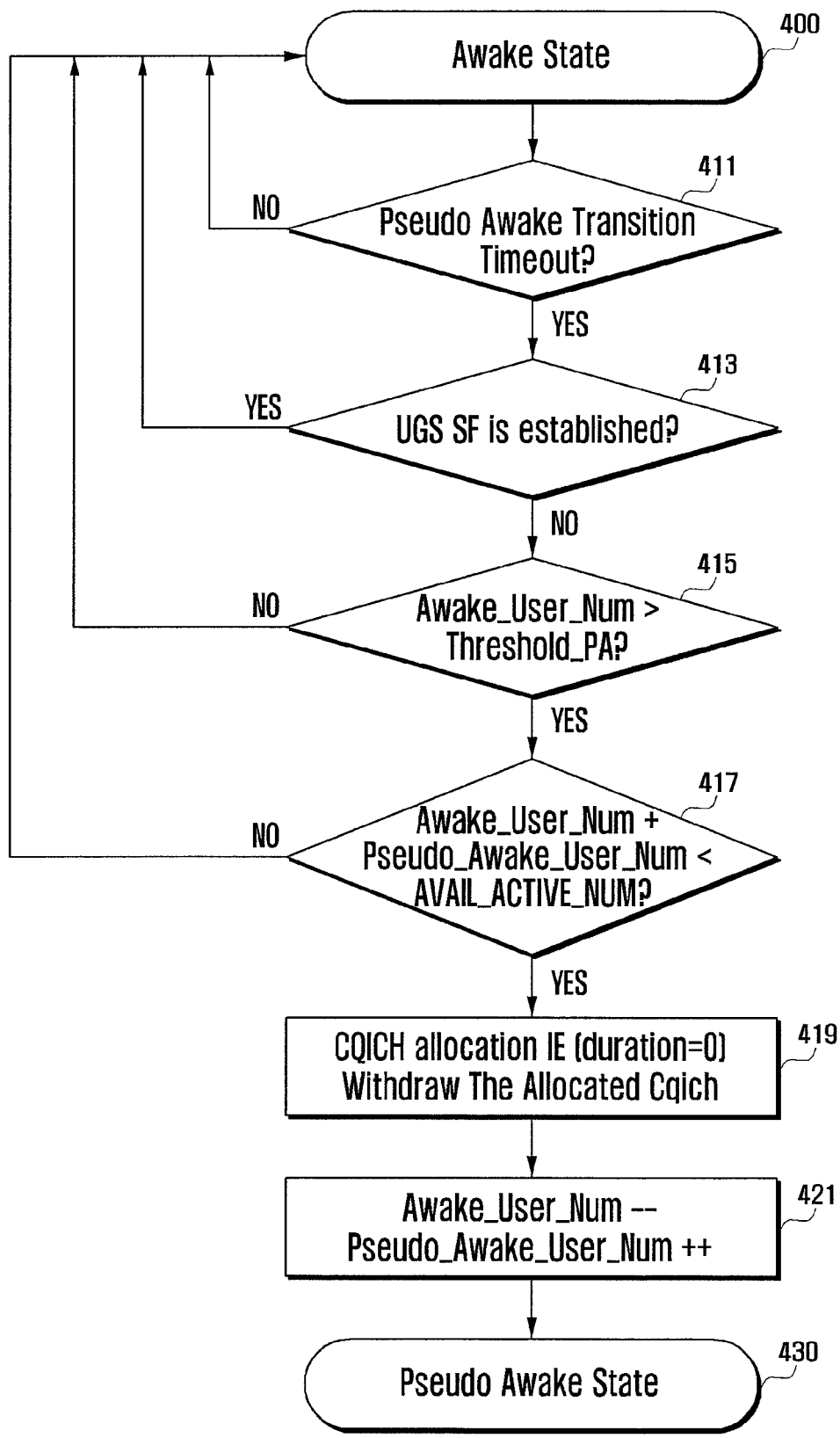
FIG. 4 is a flowchart illustrating a base station procedure for a state transition of a mobile station from an awake state to a pseudo awake state in the connection control method according to an exemplary embodiment of the present invention.

FIG. 4 is a flowchart illustrating a base station procedure for a state transition of a mobile station from the awake state to the pseudo awake state in the connection control method according to an exemplary embodiment of the present invention.

Referring to FIG. 4, the mobile station in the awake state can communicate with the base station at step 400. The base station determines whether the pseudo awake transition time of the mobile station in the awake state has expired (pseudo awake transition timeout) at step 411. That is, the base station checks the traffic channels to detect mobile stations having no traffic for the predetermined time duration (pseudo awake transition time) using a method such as polling. If the mobile station has no traffic transmission/reception for the predetermined time duration (i.e., before the pseudo awake transition time expires), the base station determines the state transition of the mobile station to the pseudo awake state.

The base station does not allocate a UL traffic channel for the mobile station in the pseudo awake state. This state does not abide by the Quality of Service (QoS) of Unsolicited Grant Service (UGS) as defined in the WiMAX standard such that, when the pseudo awake state transition condition is fulfilled, the base station determines whether a UGS Service Flow (SF) is allocated to the corresponding mobile station at step 413. If the UGS SF is established, the base station returns the procedure to step 400 to maintain the awake state of the corresponding mobile station even though the pseudo awake state condition is fulfilled. Here, the UGS SF is the communication service similar to a circuit connection service requiring connection with the mobile station regardless of the traffic transmission/reception.

If it is determined that UGS SF is not established or does not exist at step 413, the base station continues to perform the state transition of the mobile station to the pseudo awake state at step 413. Since it is an object of the present invention to provide communication service efficiently to multiple mobile stations that share the limited radio resource, the transition to the pseudo awake state is possible only when the number of awake mobile stations is less than a predetermined threshold value (Threshold_PA). That is, if the resource is available, the base station does not transition the state of the mobile station to the pseudo awake state. The base station compares the number of awake mobile stations with the resource threshold value (Threshold_PA) and, if it is determined that the resource is available as a result of the comparison (Awake_User_Num<Threshold_PA), the base station returns the procedure to step 400 to maintain the awake state of the corresponding terminal even though the pseudo awake state condition is fulfilled.

Otherwise, if it is determine that there is no available resource (Awake_User_Num≥Threshold_PA) at step 415, the base station determines whether the sum of the number of mobile stations in the awake state and the number of mobile stations in the pseudo awake state is greater than the number of system resources (Awake_User_Num+Pseudo_Awake_User_Num<AVAIL_ACTIVE_NUM) at step 417. If the sum of the numbers of mobile stations in awake and pseudo awake states is not greater than the number of system resources (Awake_User_Num+Pseudo_Awake_User_Num<AVAIL_ACTIVE_NUM), the base station returns the procedure to step 400 to maintain the awake state of the mobile station.

Otherwise, if the sum of the numbers of mobile stations in the awake and pseudo awake states is equal to or greater than the number of system resources (Awake_User_Num+Pseudo_Awake_User_Num≥AVAIL_ACTIVE_NUM), the base station sends a CQICH allocation IE (duration=0) to the corresponding mobile station to withdraw the allocated CQICH at step 419, decreases the number of awake mobile stations and increases the number of pseudo_awake mobile stations (Awake_User_Num−−, Pseudo_Awake_User_Num++) at step 421, and transitions the state of the corresponding mobile station to the pseudo awake state at step 430. As described above, the base station checks the pseudo awake transition timer of each mobile station in the awake state and, if there is no traffic transmitted/received before the expiration of the pseudo awake transition timer, transitions the state of the mobile station to the pseudo awake state.

At this time, the base station controls the state transition operations according to the following conditions even when the mobile station has no traffic during the pseudo awake transition time. If a condition for triggering transition to the pseudo awake state is fulfilled, the base station determines whether UGS SF is established for the mobile station and, if the UGS SF is not established, transitions the state of the mobile station to the pseudo awake state and, otherwise, maintains the awake state. Next, since an object of the present invention is to manage the limited radio resource for providing a communication service more efficiently, the transition to the pseudo awake state does not take place when the number of awake mobile stations (Awake User Number) is less than the predetermined resource threshold value (Threshold_PA) even though the pseudo awake state transition condition is fulfilled. That is, the base station does not apply the state transition of the mobile station to the pseudo awake state when there is the available resource, because it is difficult to expect the resource reuse gain though the pseudo awake state transition in such a case. Also, the base station performs the state transition of the mobile station to the pseudo awake state only when the sum of the numbers of mobile stations in awake and pseudo awake states is greater than the predetermined limit of system-managed resources (AVAIL_ACTIVE_NUM).

If all of the above described conditions are fulfilled, the base station determines the state transition of the mobile station from the awake state to the pseudo awake state, and transmits the CQICH allocation IE (duration=0) to the mobile station to withdraw the CQICH resource such that further traffic scheduling does not take place. After the completion of the state transition, the information related to the state transition (Awake_User_Num and Pseudo_Awake_User_Num) is updated.

The base station excludes the mobile stations in the pseudo awake state from the radio resource management and traffic scheduling. Since the state transition is performed only when the CQICH duration is changed without separate signaling process, the corresponding mobile station continues to operate in an awake state. When there is the traffic to be transmitted to the system, the mobile station transmits BRTH (BR=0) periodically. The system registers the BRTH reception time of the mobile station which does not request for bandwidth allocation with the mobile station management DB. The time information is used for the state transition of the mobile station from the pseudo awake state to the null state.

A description is made of the state transition of the mobile station from the pseudo awake state to another state hereinafter.

Figure 5:
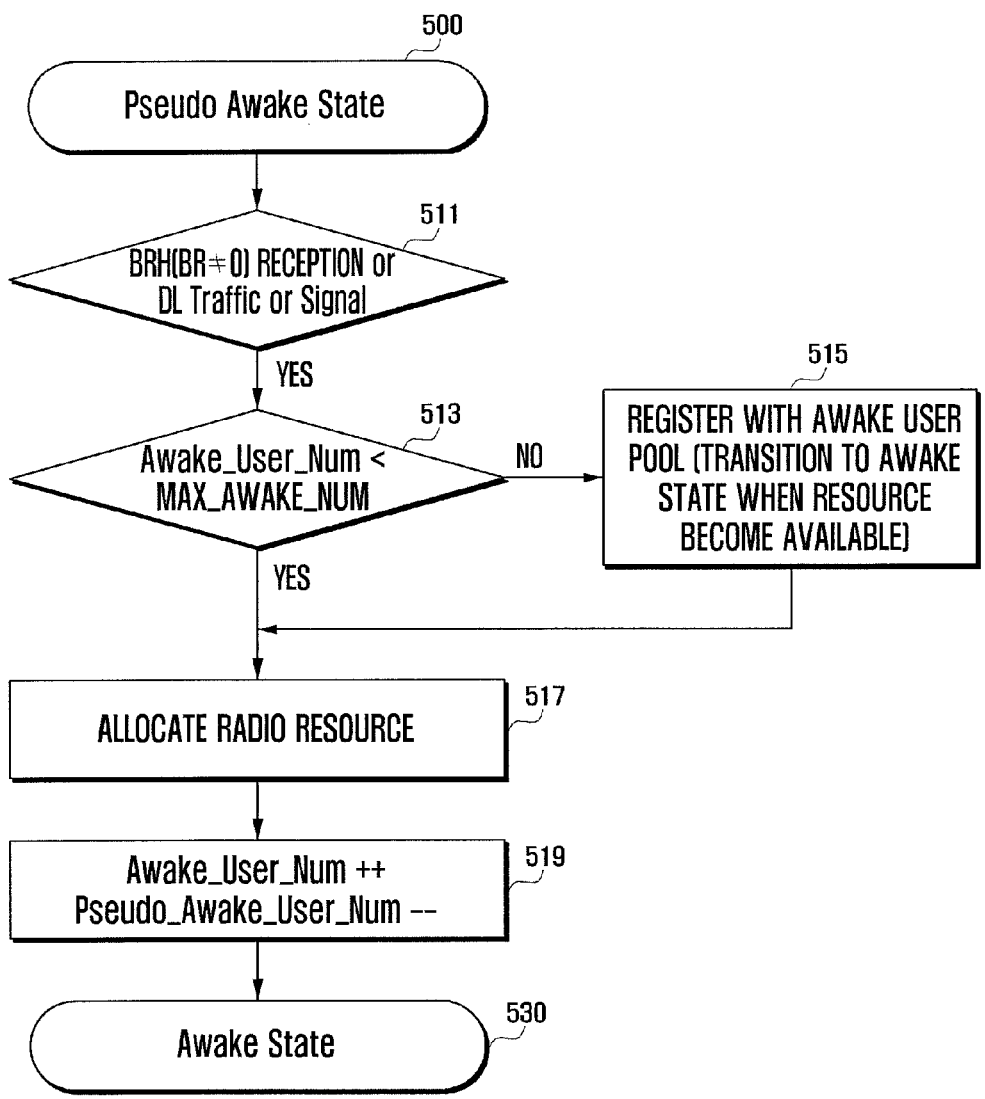
FIG. 5 is a flowchart illustrating a base station procedure for a state transition of a mobile station from a pseudo awake state to an awake state in the connection control method according to an exemplary embodiment of the present invention.

FIG. 5 is a flowchart illustrating a base station procedure for a state transition of a mobile station from the pseudo awake state to the awake state in the connection control method according to an exemplary embodiment of the present invention.

Referring to FIG. 5, the base station checks the mobile station operating in the pseudo awake state at step 500. At step 500, the mobile station is in the pseudo awake state. The base station monitors to detect the receipt of a BRTH set to a non-zero value (BR≠0) which is transmitted by the mobile station in the pseudo awake state, or an occurrence of downlink traffic, or a signal to be transmitted to the mobile terminal, at step 511. If the BRTH set to a non-zero value (BR≠0) is received or the downlink traffic or signal occurs, the base station prepares to transition the state of the mobile station from the pseudo awake state to the awake state. The base station determines whether the number of the currently connected mobile stations is less than the predetermined maximum number of connected mobile stations (Awake_User_Num<MAX_AWAKE_NUM) at step 513. If the number of the currently connected mobile stations is less than the maximum number of connected mobile stations, the base station allocates a radio resource to the corresponding mobile station at step 517, increases the number of connected mobile stations and decreases the number of mobile stations in the pseudo awake state (Awake_User_Num++, Pseudo_Awake_User_Num−−) at step 519, and transitions the state of the mobile station to the awake state at step 530.

Otherwise, if the number of the currently connected mobile stations is determined to be equal to or greater than the maximum number of connected mobile stations at step 513, the base station registers the mobile station with the recommended awake user pool at step 515. In this situation, if the radio resource becomes available, i.e., if the number of connected mobile stations becomes less than the maximum number of connected mobile stations, the base station selects one of the mobile stations registered with the recommended awake user pool and transitions the state of the selected mobile station to the awake state through steps 517 to 530.

As described above, the state transition of the mobile station from the pseudo awake state to the awake state is triggered according to one of the following. In the case where the mobile station has uplink data to be transmitted, the mobile station transmits BRTH (BR≠0) to the base station. This is a process where the mobile station in the awake state requests bandwidth necessary for an uplink transmission. If BRTH (BR≠0) is received from the mobile station in the pseudo awake state, the system performs a state transition of the mobile station to the awake state. In the case where the core network has downlink traffic (data or signal) destined for the mobile station, the base station receiving the downlink traffic performs a state transition of the mobile station to the awake state.

If one of the aforementioned events occurs, the base station determines whether there is an available awake user resource in the system. If there is an available resource, the base station allocates the radio resource to the mobile station and sends scheduling information to the mobile station to provide service. After the completion of the state transition, the base station updates related information (Awake_User_Number and Pseudo_Awake_User_Number).

Otherwise, if there is not an available resource, the base station registers the information related to the service request with the recommended awake user pool for facilitating service provision later. If the mobile station transitions from the awake state to the pseudo awake state or the idle state or the null state, the base station references the recommended awake user pool DB and performs a state transition of the mobile station to the awake state on a first come, first served basis. Since the related information is stored in the recommended awake user pool DB, the base station can transmit the information which has not been transmitted due to the lack of radio resource without a higher layer retransmission process, resulting in a reduction of service delay.

The base station can perform the state transition of the mobile station from the pseudo awake state to the null state. The base station checks the mobile station management DB periodically to manage the mobile station operating in the pseudo awake state and determines whether the difference between the BRTH reception time and the current time is equal to or greater than the system pseudo awake time. If the BRTH is not received in a predetermined time duration so as to fail updating the DB, the base station determines that the mobile station has transitioned to an abnormal state without normal release of the connection. In this case, the base station withdraws all of the resources allocated to the corresponding mobile station and leads the mobile station to transition to the null state, resulting in a decrease of Pseudo_Awake_User_Number.

The base station also can perform a state transition of the mobile station from the pseudo awake state to the idle state or the sleep state. That is, if an event occurs triggering a state transition from the pseudo awake state to the idle state, the base station performs a state transition procedure as shown in FIG. 5 to transition the state of the mobile station to the awake state and then to the idle state.

When it is detected that the system has no available resource in the state transition procedure of FIG. 5, the base station can use the recommended awake user pool to provide the service. However, this method can cause a state transition delay of the mobile station to the idle state. In order to prevent the state transition from being delayed, it is preferred for the mobile station to reserve the resource for signaling which can be reused for service traffic after the completion of the signaling with the mobile station.

As described above, the connection control apparatus and method of exemplary embodiments of the present invention are capable of improving service provision efficiency by allowing a number of mobile stations that is excessive to the limited radio resource amount (maximum number of available CQICHs), with a newly defined pseudo awake state. Also, the connection control apparatus and method of exemplary embodiments of the present invention are capable of reducing the state transition delay through intra system resource management which decreases the time of transition from the idle state to the awake state by avoiding the interaction with the mobile station and lending a resource allocated to a mobile station in the pseudo awake state to another mobile station, resulting in an increase of the number of users receiving the service.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a terminal by a base station, the method comprising:
   controlling a terminal having ongoing traffic as the terminal in an awake state;
   determining whether a pseudo awake timer of the terminal expires, wherein the pseudo awake timer expires if the terminal has no traffic in the awake state during time configured in the pseudo awake timer; and
   if the pseudo awake timer expires, releasing a resource allocated to the terminal, and
   transitioning the state of the terminal from the awake state to a pseudo awake state,
   wherein the pseudo awake state comprises a state where the terminal is awake and a radio resource is not allocated to the terminal by the base station.

2. The method of claim 1, wherein the base station comprises a WiMAX base station.

3. The method of claim 2, further comprising:
   comparing, if the pseudo awake timer expires, a number of awake terminals with a resource threshold value;
   maintaining, if the number of awake terminals is equal to or less than the resource threshold value, the awake state of the terminal.

4. The method of claim 3, further comprising:
   comparing, if the number of awake terminals is greater than the resource threshold value, a sum of a number of terminals in the awake and pseudo awake states with a system management resource number; and
   maintaining, if the sum is equal to or less than the system management resource number, the awake state of the terminal.

5. The method of claim 2, further comprising:
   determining, if the pseudo awake timer expires, whether the terminal has established an Unsolicited Grant Service (UGS) Service Flow (SF) connection; and
   managing, if the terminal has established the UGS SF connection, the awake state of the terminal.

6. The method of claim 4, wherein the transitioning of the state of the terminal to the pseudo awake state comprises:
   transmitting a Channel Quality Indicator Channel (CQICH) allocation Information Element (IE) with a duration equal to zero as defined in the WiMAX 802.16e standard to the terminal to withdraw a CQICH resource allocated to the terminal; and
   transitioning the state of the terminal to the pseudo awake state.

7. The method of claim 2, further comprising:
   managing a time of receipt of a message transmitted periodically by the terminal in the pseudo awake state; and
   transitioning, if the message is not received before the system pseudo awake timer expires, the state of the terminal to a null state with a deletion of information on the terminal,
   wherein the system pseudo awake timer is used for determining whether the terminal in the pseudo awake state is disconnected abnormally.

8. The method of claim 7, further comprising storing a time if a Bandwidth Request Traffic Header (BRTH) requesting no bandwidth which is transmitted periodically by the terminal in the pseudo awake station, is received, and the system pseudo awake timer is used to determine whether the BRTH requesting no bandwidth is received before an expiration of the system pseudo awake timer.

9. The method of claim 2, further comprising:
   determining whether the terminal in the pseudo awake state has an occurrence of traffic; and
   transitioning, if the terminal in the pseudo awake state has the occurrence of traffic, the state of the terminal to the awake state.

10. The method of claim 9, wherein the occurrence of traffic comprises one of receiving a BRTH message from the terminal in the pseudo awake state or receiving traffic to be forwarded to the terminal in the pseudo awake state from a core network.

11. The method of claim 10, wherein the transitioning of the state of the terminal to the pseudo awake state comprises:
    determining, if the occurrence of traffic is detected, whether an available awake resource exists;
    registering, if no available awake resource exists, the terminal with a recommended awake user pool; and
    transitioning, if the awake resource becomes available, the state of the terminal registered with the recommended awake user pool to the awake state,
    wherein the recommended awake user pool comprises a database for storing information on terminals allocated no available resource in transitioning from the pseudo awake state to the awake state.

12. The method of claim 11, wherein the awake resource becomes available if the state of the terminal transitions from the awake state to one of the idle state, the pseudo awake state, and the null state.

13. The method of claim 2, further comprising transitioning, if an idle state transition event occurs, to the idle state via the awake state.

14. The method of claim 13, wherein the terminal transitions from the pseudo awake state to the awake state using a preoccupied resource which is allocated for preventing signaling failure due to an exhaustion of the resource.

15. A base station for controlling a terminal in a mobile communication system, the base station comprising:
    a transceiver configured to transmit and receive signals;
    a controller configured to control the terminal having ongoing traffic in an awake state, determine whether a pseudo awake timer of the terminal expires, wherein the pseudo awake timer expires if the terminal has no traffic in the awake state during time configured in the pseudo awake timer, and if the pseudo awake timer expires, release a resource allocated to the terminal and transition the state of the terminal from the awake state to a pseudo awake state,
    wherein the pseudo awake state comprises a state where the terminal is awake and a radio resource is not allocated to the terminal by the base station.

16. The base station of claim 15, wherein the base station comprises a WiMAX base station.

17. The base station of claim 16, wherein the controller is configured to maintain the awake state of the terminal if at least one of an expiration of the pseudo awake timer is detected, a number of terminals in the awake state is greater than a predetermined number, and a sum of the number of terminals in the awake state and the number of terminal in the pseudo awake state is greater than a predetermined number.

18. The base station of claim 16, wherein the controller is configured to determine, if the pseudo awake timer expires, whether the terminal has established an Unsolicited Grant Service (UGS) Service Flow (SF) connection and maintain, if the terminal has established the UGS SF connection, the awake state of the terminal.

19. The base station of claim 16, wherein the controller is configured to comprise a system pseudo awake timer for counting time for determining whether the terminal in the pseudo awake state is disconnected abnormally, and manage a time of a receipt of a message transmitted periodically by the terminal in the pseudo awake state and transition, if the message is not received before the system pseudo awake timer expires, the state of the terminal to a null state with deletion of information on the terminal.

20. The base station of claim 19, wherein the controller is configured to comprise a recommended awake user pool for storing information on terminals that are not allocated an available resource in transitioning from the pseudo awake state to the awake state, and determine whether an available awake resource exists when traffic occurs, registers, when no available awake resource exists, the terminal with the recommended awake user pool, and transition, if the awake resource becomes available, the state of the terminal registered with the recommended awake user pool to the awake state.

* * * * *